United States Patent [19]

Lo

[11] Patent Number: 6,089,943

[45] Date of Patent: Jul. 18, 2000

[54] TOY

[75] Inventor: Wai Shing Lo, Kowloon, The Hong Kong Special Administrative Region of the People's Republic of China

[73] Assignee: Tai Sun Plastic Novelties Ltd., Kowloon, The Hong Kong Special Administrative Region of the People's Republic of China

[21] Appl. No.: 09/183,364

[22] Filed: Oct. 30, 1998

[51] Int. Cl.[7] ................................................. A63H 3/36

[52] U.S. Cl. ...................... 446/175; 446/72; 446/297; 446/390; 434/169; 434/185; 434/317

[58] Field of Search .................. 446/175, 390, 446/369, 72, 81, 297; 358/473; 434/169, 185, 317

[56] References Cited

U.S. PATENT DOCUMENTS

| | | |
|---|---|---|
| 4,457,719 | 7/1984 | Dittakavi et al. ..................... 434/159 |
| 4,505,682 | 3/1985 | Thompson ............................ 434/335 |
| 4,602,152 | 7/1986 | Dittakavi . |
| 4,672,215 | 6/1987 | Howard ................................ 250/566 |
| 4,729,564 | 3/1988 | Kuna et al. .......................... 434/335 |
| 5,059,126 | 10/1991 | Kimball ............................... 434/308 |
| 5,267,886 | 12/1993 | Wood et al. .......................... 446/175 |
| 5,314,336 | 5/1994 | Diamond et al. .................... 434/169 |
| 5,575,659 | 11/1996 | King et al. .......................... 434/467 |
| 5,818,886 | 10/1998 | Cusolito .............................. 446/444 |
| 5,899,700 | 5/1999 | Williams et al. ..................... 434/308 |

*Primary Examiner*—Kien T. Nguyen
*Assistant Examiner*—Jeffrey D. Carlson
*Attorney, Agent, or Firm*—Darby & Darby

[57] ABSTRACT

An educational toy comprises a soft toy (10) carrying a barcode scanner (20) for scanning a number of barcodes each individually associated with a visual message in a book (12). A decoder and audio device in the toy generate an audio message corresponding to that visual message in the book associated with the scanned barcode.

6 Claims, 3 Drawing Sheets

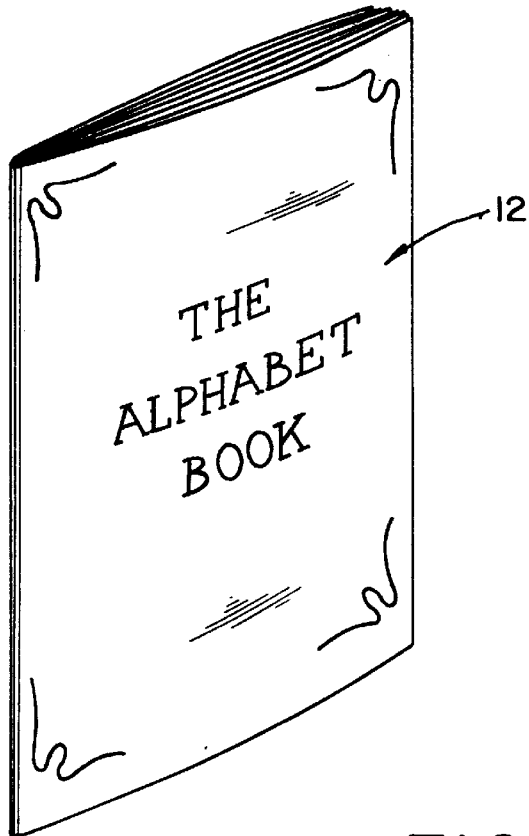
FIG. 3A
FIG. 3B
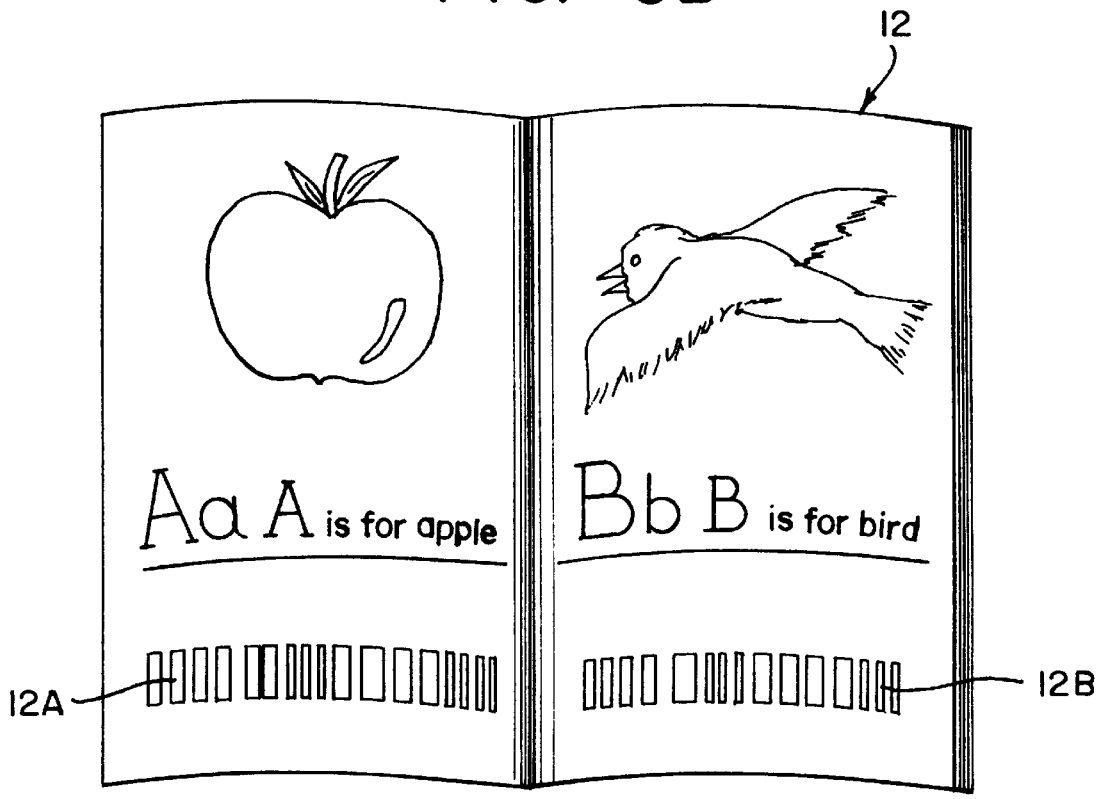

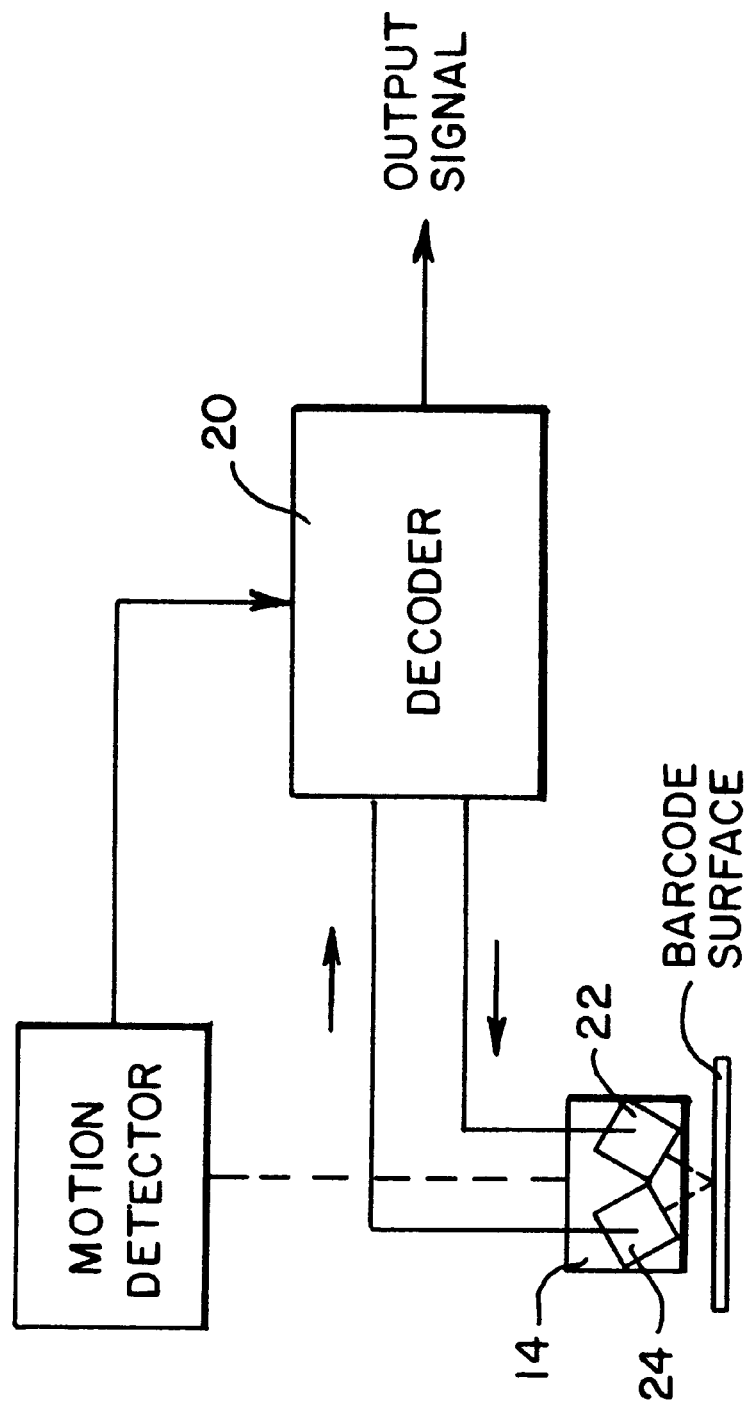

TOY

BACKGROUND OF THE INVENTION

1. Field of the Invention

This invention relates to an educational toy.

2. Description of Related Art

It is known to provide a children's toy in the form of a soft toy animal with a battery powered voice or music microchip embedded within the toy operable by a switch on the toy. Such a microchip may be preprogrammed with a number of different voice messages or musical tunes each of which is selectively operable by the user operating a switch on the toy.

SUMMARY OF THE INVENTION

In accordance with the present invention there is provided an educational toy comprising a first article having a barcode scanner, a decoder and an audio device, the audio device being responsive to an output signal from the decoder to produce a predetermined audio message, and a second scannable article having a number of barcodes thereon and a corresponding number of associated visual messages thereon each being a visual form of a respective said audio message, whereby scanning a barcode of the second article by the scanner activates the decoder and audio device to produce an audio message corresponding to the visual message associated with the scanned barcode.

The first article preferably comprises a soft toy in the form of an animal with the scanner carried by a limb of the toy animal, and the second article preferably comprises a book, each page of which has a said visual message and an associated barcode.

The toy preferably also includes a motion sensor, movement of which activates the scanner and decoder, and conveniently both the scanner and the motion sensor are located on the same limb of the toy animal.

The scanner may comprise a light emitting diode and a phototransistor responsive to the intensity of light emitted from the diode and reflected to the phototransistor from a barcode being scanned. The decoder may comprises a microprocessor having a number of barcode patterns stored in memory and being actuable to compare an input signal from the scanner with said patterns and upon locating a match, produce an output signal to the audio device.

BRIEF DESCRIPTION OF THE DRAWINGS

Other features of the invention will become apparent from the following description given herein solely by way of example with reference to the accompanying drawings wherein

FIG. 3A is a diagrammatic view of a book for use with the toy shown in FIGS. 1 and 2, in closed condition;

FIG. 3B is a diagrammatic view of the book shown in FIG. 3A in open condition; and FIG. 4 is a block diagram showing the scanner, motion sensor and decoder of the invention.

DETAILED DESCRIPTION OF THE PREFERRED EMBODIMENTS

Figure 1:
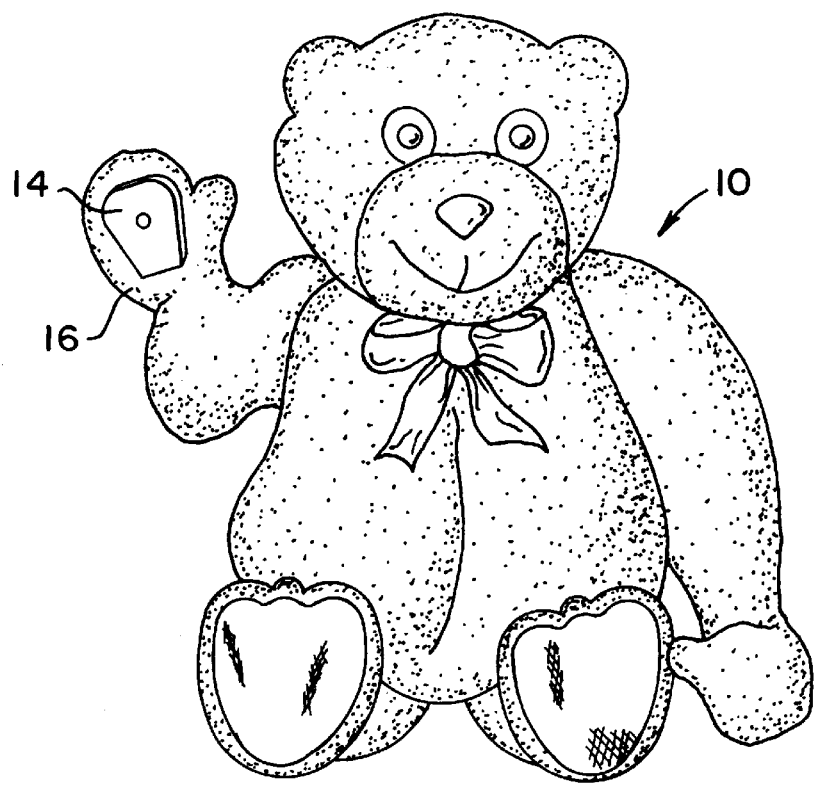
FIG. 1 is a front diagrammatic view of a soft toy carrying a barcode scanner.
Figure 2:
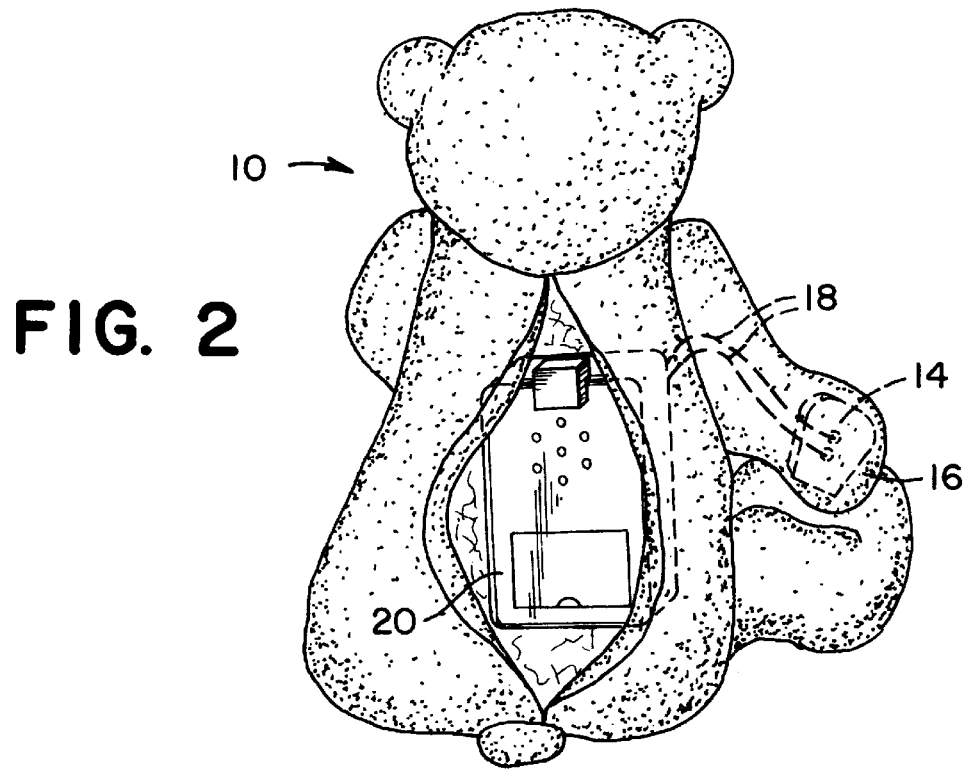
FIG. 2 is a rear view of the toy showing the decoder and audio device embedded in the body of the toy.

As illustrated diagrammatically, the educational toy of the invention comprises a soft toy 10 in the form of an animal as shown in FIGS. 1 and 2 together with a book 12 as shown in FIG. 3. The soft toy 10 carries a motion sensor and scanner 14 conveniently located adjacent one another on a hand 16 of the toy animal. As is visible in FIG. 2, the motion sensor and scanner are wired at 18 internally of the toy animal to a battery powered decoder 20 and audio device embedded within the body of the animal and accessible from the rear thereof.

The book 12 shown in FIG. 3 is provided with a number of visual messages each of which has an associated barcode 12A, 12B, etc.

The decoder 20 may comprise for example a Toshiba microprocessor model no. TMP47C101 capable of storing a number of barcode patterns preprogrammed in its memory. The scanner 14 conveniently comprises a light emitting diode 22 and a phototransistor 24 housed together in a moulding and mounted on a limb of the toy animal as shown. The phototransistor is responsive to the intensity of light radiated from the diode when a reflective object such as a barcode is placed within the field of view. The motion sensor is a simple mechanical switch moveable between make and break conditions.

In use, a child may pick up the soft toy 10 and move its hand 16 so as to cause the scanner 14 to move across a barcode 12A etc. in the book 12. This movement causes the motion sensor to switch on the light emitting diode 22 of the scanner and activate the barcode reader logic. Upon scanning the barcode, light emitted from the light emitting diode 22 is reflected back to the phototransistor 24 which converts the visual signals to an electrical signal to the decoder 20. The scanned pattern is compared with the barcode patterns in the microprocessor memory and if a match is found, an appropriate output signal is generated. Such output signal activates an audio device in the form for example of a voice chip to generate an audio message corresponding to the matched barcode.

Thus for example, with reference to FIG. 3, if the scanner 14 is caused to scan the barcode 12A associated with the letter A and the picture of an apple, the voice message generated by the audio device will be "A is for apple" the same as the visual message on the page of the book. In this example each page of the book contains a letter of the alphabet together with a picture of an article beginning with that letter and a simple written visual message such as "A is for apple", "B is for bird", etc. Each visual message on a page has an associated individual barcode matchable to one of the barcode patterns in the microprocessor memory whereby an appropriate output signal can be produced to generate a corresponding audio message. The soft toy thus "speaks" to the child telling the child what is on each page of the book.

I claim:

1. An education toy in the form of an animal comprising a first article having at least one articulated member comprising a limb of said animal, a barcode scanner in said articulated member and movable therewith, and a decoder and an audio device in said first article, the audio device being responsive to an output signal from the decoder to produce a predetermined audio message, and a second scannable article having a number of barcodes thereon and a corresponding number of associated visual messages thereon each being a visual form of a respective said audio message, whereby articulated movement of said articulated member causes scanning of a barcode of the second article by the scanner which activates the decoder and audio device to produce an audio message corresponding to the visual message associated with the scanned barcode.

2. An educational toy as claimed in claim 1 wherein the second article comprises a book, each page of which has a said visual message and an associated barcode.

3. An educational toy as claimed in claim 2 including a motion sensor, movement of which activates the scanner and decoder.

4. An educational toy as claimed in claim 3 wherein the scanner and the motion sensor are located on the same limb of the toy animal.

5. An educational toy as claimed in claim 1 wherein the scanner comprises a light emitting diode and a phototransistor responsive to the intensity of light emitted from the diode and reflected to the phototransistor from a barcode being scanned.

6. An educational toy as claimed in claim 5 wherein the decoder comprises a microprocessor having a number of barcode patterns stored in memory and being actuable to compare an input signal from the scanner with said patterns and upon locating a match, produce an output signal to the audio device.

* * * * *